United States Patent
Zeng et al.

(10) Patent No.: US 10,409,362 B2
(45) Date of Patent: Sep. 10, 2019

(54) ELECTRONIC DEVICE FOR PREVENTING EYE DAMAGE THROUGH LONG-TIME VIEWING AND METHOD THEREOF

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Hua-Hu Zeng, Shenzhen (CN); Gang-Hua Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 36 days.

(21) Appl. No.: 15/802,392

(22) Filed: Nov. 2, 2017

(65) Prior Publication Data

US 2018/0373319 A1 Dec. 27, 2018

(30) Foreign Application Priority Data

Jun. 27, 2017 (CN) .......................... 2017 1 0503270

(51) Int. Cl.
| | |
|---|---|
| *G06F 3/01* | (2006.01) |
| *G01J 1/42* | (2006.01) |
| *G01D 1/14* | (2006.01) |
| *G08B 21/04* | (2006.01) |
| *G08B 21/18* | (2006.01) |
| *G01D 21/02* | (2006.01) |

(Continued)

(52) U.S. Cl.
CPC .............. *G06F 3/011* (2013.01); *G01D 1/14* (2013.01); *G01D 21/02* (2013.01); *G01J 1/4204* (2013.01); *G06F 3/147* (2013.01); *G08B 21/0423* (2013.01); *G08B 21/0469* (2013.01); *G08B 21/182* (2013.01); *A61H 5/00* (2013.01); *G09G 5/00* (2013.01); *G09G 2354/00* (2013.01); *G09G 2360/144* (2013.01); *G09G 2360/145* (2013.01)

(58) Field of Classification Search
CPC ...... G06F 3/011; G09G 5/00; G09G 2354/00; G08B 21/182; G08B 21/0423; G08B 21/0469; G01J 1/4204; G01D 1/14; A61H 5/00

See application file for complete search history.

(56) References Cited

U.S. PATENT DOCUMENTS

| | | | |
|---|---|---|---|
| 10,015,859 B2* | 7/2018 | Dong | G09G 3/3413 |
| 2003/0206163 A1* | 11/2003 | Kee | G09G 3/36 345/204 |
| 2014/0022223 A1* | 1/2014 | Jung | H04M 1/22 345/207 |

FOREIGN PATENT DOCUMENTS

| | | |
|---|---|---|
| TW | 201440003 | 10/2014 |
| TW | 201517010 | 5/2015 |
| TW | M537282 | 2/2017 |

* cited by examiner

*Primary Examiner* — Muhammad N Edun
(74) *Attorney, Agent, or Firm* — ScienBiziP, P.C.

(57) ABSTRACT

An electronic device with display characteristics which reduce long-time damage to user's eyes has a verifiable eye protection system. A verified verification information received from user causes the device to acquire surrounding brightness value detect by an illumination sensor and determine whether the brightness value is in a range suggesting too-low or over bright light. The display screen of the electronic device is turned off when the brightness value is within one of certain brightness ranges. A method for such eye protection is also provided.

17 Claims, 4 Drawing Sheets

(51) Int. Cl.
*G06F 3/147* (2006.01)
*A61H 5/00* (2006.01)
*G09G 5/00* (2006.01)

and a processor 19. The input unit 10 is used to input data or a control command. In at least one exemplary embodiment, the input unit 10 can be a keyboard with a number of keys, or a mouse. In another embodiment, the input unit 10 and the display unit 12 can be a touch screen.
ELECTRONIC DEVICE FOR PREVENTING EYE DAMAGE THROUGH LONG-TIME VIEWING AND METHOD THEREOF

CROSS-REFERENCE TO RELATED APPLICATIONS

This application claims priority to Chinese Patent Application No. 201710503270.8 filed on Jun. 27, 2017, the contents of which are incorporated by reference herein.

FIELD

The subject matter herein generally relates to electronic products, especially relates to an electronic device for preventing eye damage through long-time viewing and a method thereof.

BACKGROUND

Smart phones are more and more popular, and the smart phone becomes an indispensable tool for people to acquire information. However, people always view the smart phone for a long time, which is harmful to people's eyes.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
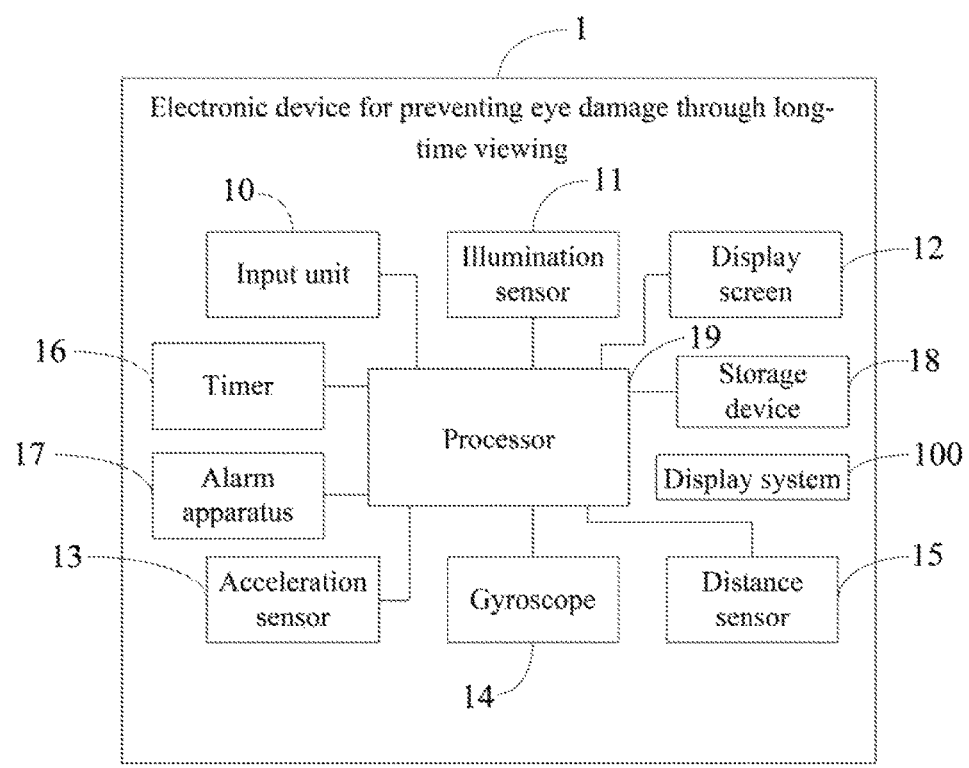
FIG. 1 is a block diagram of an exemplary embodiment of an electronic device for preventing eye damage through long-time viewing.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" exemplary embodiment in this disclosure are not necessarily to the same exemplary embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates an electronic device 1 for preventing eye damage through long-time viewing. In at least one exemplary embodiment, the electronic device 1 can be smart phone, a tablet computer, a handheld computer, or other suitable device. The electronic device 1 includes, but is not limited to, an input unit 10, an illumination sensor 11, a display screen 12, an acceleration sensor 13, a gyroscope 14, a distance sensor 15, a timer 16, an alarm apparatus 17, a storage device 18, and a processor 19. The input unit 10 is used to input data or a control command. In at least one exemplary embodiment, the input unit 10 can be a keyboard with a number of keys, or a mouse. In another embodiment, the input unit 10 and the display unit 12 can be a touch screen.

The illumination sensor 11 is used to detect brightness value around the electronic device 1. The display screen 12 is provides a display. The acceleration sensor 13 is used to detect an acceleration value of the electronic device 1. When user holds the electronic device 1, the acceleration value detected by the acceleration sensor 13 reflects user motion. The gyroscope 14 is used to detect orientation or angular velocity value of the electronic device 1. The orientation or angular velocity value detected by the gyroscope reflects user posture when holding the electronic device 1. The distance sensor 15 is used to detect a distance value between human face and electronic device 1. In at least one exemplary embodiment, the distance sensor 15 can be an infrared sensor. The timer 16 is used to record a display time of the display screen 12. In at least one exemplary embodiment, when the display screen 12 reopens, the timer 16 cleans out the last display time of the display screen 12 and counts time again.

The storage device 18 is used to store program code and data of the electronic device 1. For example, the storage device 18 stores a preset verification information. In at least one exemplary embodiment, the preset verification information can be numbers, letters, patterns or the combination of numbers, letters, and the patterns. In at least one exemplary embodiment, the storage device 18 can include various types of non-transitory computer-readable storage mediums. For example, the storage device 18 can be an internal storage system of the electronic device 1, such as a flash memory, a random access memory (RAM) for temporary storage of information, and/or a read-only memory (ROM) for permanent storage of information. The storage device 18 can also be an external storage system, such as a hard disk, a storage card, or a data storage medium. The processor 19 can be a central processing unit (CPU), a microprocessor, or other data processor chip that performs functions of display system 100.

Figure 2:
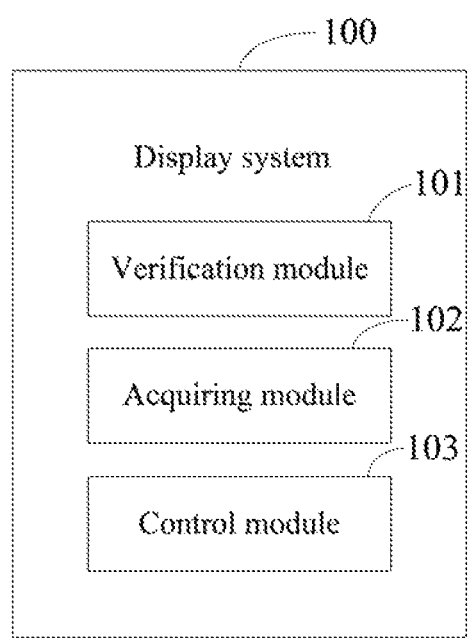
FIG. 2 is a block diagram of an exemplary embodiment of a display system of the device of FIG. 1.

FIG. 2 illustrates the display system 100 of FIG. 1. The system 100 includes a number of modules, which are a collection of software instructions which can be executed by the processor 19. In the exemplary embodiment, the modules can include, but are not limited to, a verification module 101, an acquiring module 102, and a control module 103.

Figure 3:
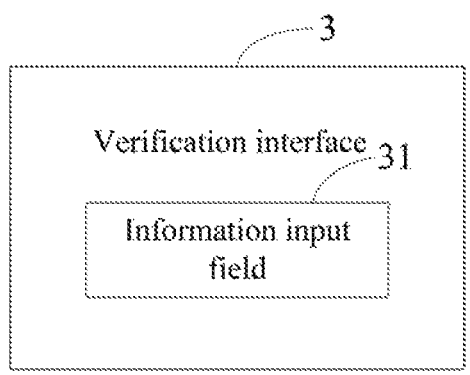
FIG. 3 is a schematic diagram of an exemplary embodiment of a verification interface of the device of FIG. 1.

The verification module 101 receives information input through the input unit 10, and compares the received information with preset verification information. In at least one exemplary embodiment, the verification module 101 displays a verification interface 3 on the display screen 12. FIG. 3 illustrates the verification interface 3. The verification interface 3 includes an information input field 31. User can input information by the information input field 31. For example, the information can be numbers, letters, or combination of numbers and letters, the verification module 101 can receive the numbers, letters, or combination of numbers and letters input by the input unit 10 as the verification information, and compare the received information with the preset verification information.

The acquiring module 102 acquires the brightness value detected by the illumination sensor 11 when the information is verified with the preset verification information.

The control module 103 determines whether the brightness value around the electronic device 1 is in a first preset brightness range, and turns off the display screen 12 or the electronic device 1 when the brightness value is in the first brightness range. In at least one exemplary embodiment, the value of the first preset range corresponds to a dark environment, viewing in which being harmful to user's eyes. Therefore, when determining that the brightness value around the electronic device 1 is in the first preset brightness range, the control module 103 turns off the display screen 12 or the electronic device 1 to avoid user viewing the display screen 12 in the dark environment.

In at least one exemplary embodiment, the control module 103 further determines whether the brightness value around the electronic device 1 is in a preset second preset brightness range, and turns off the display screen 12 or the electronic device 1 when the brightness value is in the second brightness range. In at least one exemplary embodiment, the value of the second preset range corresponds to the brightness of a very brightly lit environment, viewing in which being harmful to user's eyes. Therefore, when determining that the brightness value around the electronic device 1 is in the second preset brightness range, the control module 103 turns off the display screen 12 or the electronic device 1 to avoid user viewing the display screen 12 in a bright light environment.

In at least one exemplary embodiment, the acquiring module 102 acquires the acceleration value detected by the acceleration sensor 13. The control module 103 compares the acceleration value of the electronic device 1 with a preset acceleration value, and turns off the display screen 12 or the electronic device 1 when the acceleration value of the electronic device 1 is more than the preset acceleration value. When user holds the electronic device 1, the acceleration value of the electronic device 1 reflects user motion, such as during walking or standing still. In at least one exemplary embodiment, the preset acceleration value corresponds to the acceleration value when user is walking. Therefore, when determining that the acceleration value of the electronic device 1 is more than the preset acceleration value, the control module 103 turns off the display screen 12 or the electronic device 1 to avoid user viewing the display screen 12 when walking.

In at least one exemplary embodiment, the acquiring module 102 acquires the angular velocity value detected by the gyroscope 14. The control module 103 compares the angular velocity value of the electronic device 1 with a preset angular velocity value, and turns off the display screen 12 or the electronic device 1 when the angular velocity value of the electronic device 1 is not matched with the preset angular velocity value. When user holds the electronic device 1, the angular velocity value of the electronic device 1 reflects user posture of holding the electronic device 1. In at least one exemplary embodiment, the preset angular velocity value corresponds to the angular velocity value of an unhealthy posture. Therefore, when determining that the angular acceleration value of the electronic device 1 is not matched with the preset angular velocity value, the control module 103 turns off the display screen 12 or the electronic device 1 to avoid user viewing the display screen 12 when in an unhealthy posture.

In at least one exemplary embodiment, the acquiring module 102 acquires the distance value detected by the distance sensor 15. The control module 103 determines whether the distance value between human face and the display screen 12 is in a preset distance range, and turns off the display screen 12 or the electronic device 1 when the distance value is not in the preset distance range. In at least one exemplary embodiment, the preset distance range can be a distance range between 12 cm to 25 cm. Therefore, when determining that the angular acceleration value of the electronic device 1 is not in the preset distance range, the control module 103 turns off the display screen 12 or the electronic device 1 to force user to view the display screen 12 from an appropriate distance.

In at least one exemplary embodiment, the acquiring module 102 acquires the accumulated display time of the display screen recorded by the timer 16. The control module 103 compares the display time with a preset time period, and controls the alarm apparatus 17 to alarm when the display time recorded by the timer 16 is more than the preset time period. In at least one exemplary embodiment, the preset time can be 10 minutes. The alarm apparatus 17 can be a vibrator or a loudspeaker. For example, when the display time acquired by acquiring module 102 is more than the preset time, the control module 103 controls the vibrator to vibrate or controls to the loudspeaker to output a preset voice information to remind user that he has been viewing the display screen 12 for a long time and should have a rest. In at least one exemplary embodiment, the acquiring module 102 further records the alert issued by the alarm apparatus 17, and the control module 103 turns off the electronic device 1 when the alerts recorded by the acquiring module 102 are more than a preset number of alerts.

Figure 4:
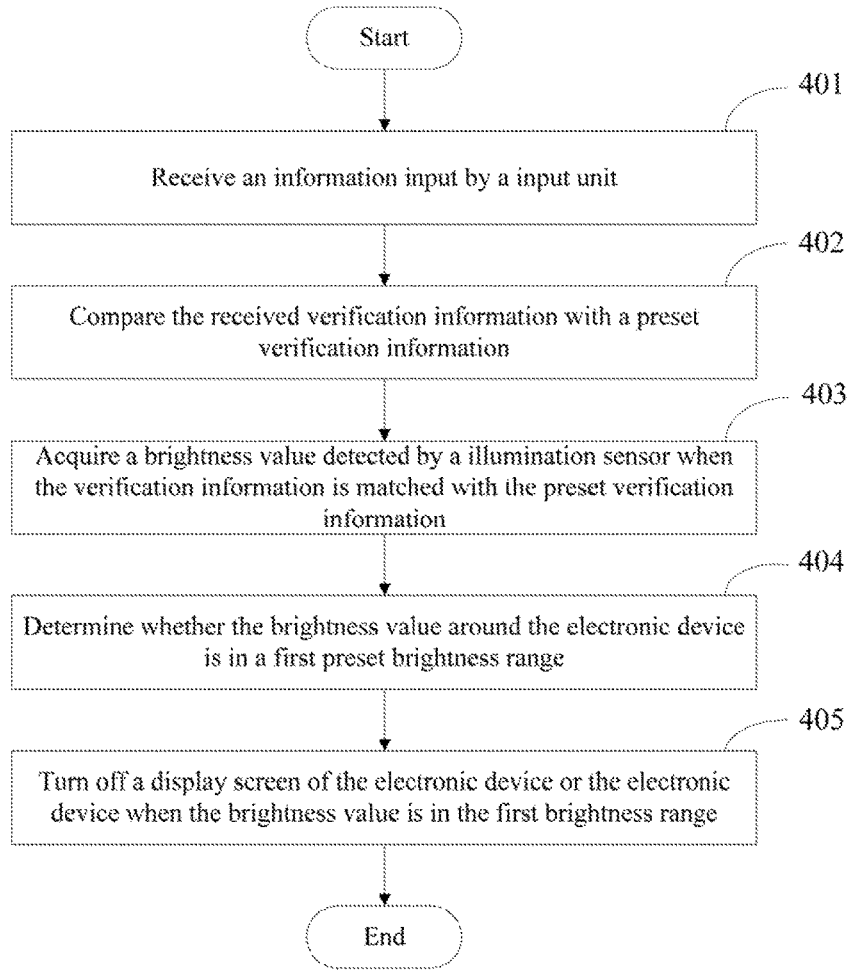
FIG. 4 is a flowchart of an exemplary embodiment of a method for preventing eye damage through long-time viewing.

FIG. 4 illustrates a flowchart of an exemplary embodiment of method for preventing eye damage through long-time viewing. The method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 401.

At block 401, the electronic device receives a information input by a input unit. In at least one exemplary embodiment, the electronic device displays a verification interface 3 on the display screen 12. User can inputs the information by the information input field 31. For example, the information can be numbers, letters, or combination of numbers and letters, the electronic device can receive the numbers, letters, or combination of numbers and letters input by the input unit 10 as the verification information.

At block 402, the electronic device compares the received verification information with a preset verification information.

At block 403, the electronic device acquires a brightness value detected by a illumination sensor when the information is matched with the preset verification information.

At block 404, the electronic device determines whether the brightness value around the electronic device is in a first preset brightness range.

At block 405, the electronic device turns off a display screen of the electronic device or the electronic device when the brightness value is in the first brightness range. In at least one exemplary embodiment, the value of the first preset range corresponds to a dark environment, viewing in which being harmful to user's eyes. Therefore, when determining that the brightness value around the electronic device is in the first preset brightness range, the electronic device turns off the display screen or the electronic device to avoid user viewing the display screen in the dark environment.

In at least one exemplary embodiment, the method further includes: the electronic device determines whether the brightness value around the electronic device is in a preset second preset brightness range; and the electronic device turns off the display screen or the electronic device when the brightness value is in the second brightness range. In at least one exemplary embodiment, the value of the second preset range corresponds to the brightness vale of a very brightly lit environment, viewing in which being harmful to user's eyes. Therefore, when determining that the brightness value around the electronic device is in the second preset brightness range, the electronic device turns off the display screen or the electronic device to avoid user viewing the display screen in the strong light environment.

In at least one exemplary embodiment, the method further includes: the electronic acquires the acceleration value detected by an acceleration sensor; the electronic device compares the acceleration value of the electronic device with a preset acceleration value; and the electronic device turns off the display screen or the electronic device when the acceleration value of the electronic device is more than the preset acceleration value. When user holds the electronic device, the acceleration value of the electronic device reflects user motion, such as during walking or standing still. In at least one exemplary embodiment, the preset acceleration value when user is walking. Therefore, when determining that the acceleration value of the electronic device is more than the preset acceleration value, the electronic device turns off the display screen or the electronic device to avoid user viewing the display screen when walking.

In at least one exemplary embodiment, the method further includes: the electronic device acquires the angular velocity value detected by a gyroscope; the electronic compares the angular velocity value of the electronic device with a preset angular velocity value; and the electronic turns off the display screen or the electronic device when the angular velocity value of the electronic device is not matched with the preset angular velocity value. When user holds the electronic device, the angular velocity value of the electronic device reflects user posture of holding the electronic device. In at least one exemplary embodiment, the preset angular velocity value corresponds to the angular velocity value of an unhealthy posture information about holding the electronic device. Therefore, when determining that the angular acceleration value of the electronic device is not matched with the preset angular velocity value, the electronic device turns off the display screen or the electronic device to avoid user viewing the display screen when in an unhealthy.

In at least one exemplary embodiment, the method further includes: the electronic device acquires a distance value detected by a distance sensor; the electronic device determines whether the distance value between human face and the display screen is in a preset distance range; and the electronic device turns off the display screen or the electronic device when the distance value is not in the preset distance range. In at least one exemplary embodiment, the preset distance range can be a distance range between 12 cm to 25 cm. Therefore, when determining that the angular acceleration value of the electronic device is not in the preset distance range, the electronic device turns off the display screen or the electronic device to force user to view the display screen from an appropriate distance.

In at least one exemplary embodiment, the method further includes: the electronic device acquires a display time recorded by a timer; the electronic device compares the display time with a preset time period; and the electronic device controls the alarm apparatus to alarm when the display time recorded by the timer is more than the preset time period. In at least one exemplary embodiment, the preset time can be 10 minutes. The alarm apparatus can be a vibrator or a loudspeaker. For example, when the display time is more than the preset time, the electronic device controls the vibrator to vibrate or controls to the loudspeaker to output a preset voice information to remind user that he has been viewing the display screen for a long time and should have a rest. In at least one exemplary embodiment, the electronic device further records the alert issued by the alarm apparatus, and the electronic device turns off the electronic device when the recorded alerts are more than a preset number of alerts.

It should be emphasized that the above-described exemplary embodiments of the present disclosure, including any particular exemplary embodiments, are merely possible examples of implementations, set forth for a clear understanding of the principles of the disclosure. Many variations and modifications can be made to the above-described exemplary embodiment(s) of the disclosure without departing substantially from the spirit and principles of the disclosure. All such modifications and variations are intended to be included herein within the scope of this disclosure and protected by the following claims.

What is claimed is:

1. An electronic device for preventing eye damage through long-time viewing comprising:
   an input unit;
   a display screen;
   an illumination sensor configured to detect a brightness value around the electronic device;
   a gyroscope configured to detect angular velocity value of the electronic device;
   a processor coupled to the input unit, the gyroscope, and the display unit; and a non-transitory storage medium coupled to the processor and configured to store a plurality of instructions, which cause the electronic device to:
  receive an information input by the input unit;
  compare the received information with a preset verification information;
  acquire the brightness value detected by the illumination sensor when the information is matched with the preset verification information;
  determine whether the brightness value is in a first preset brightness range;
  acquire the angular velocity value of the electronic device detected by the gyroscope;
  compare the angular velocity value of the electronic device with a preset angular velocity value; and
  turn off the display screen or the electronic device when the brightness value is in the first brightness range and when the angular velocity value of the electronic device is not matched with the preset angular velocity value.

2. The electronic device as recited in claim 1, wherein the electronic device further comprises an acceleration sensor, the acceleration sensor is configured to detect an acceleration value of the electronic device, the plurality of instructions is further configured to cause the device to:
  acquire the acceleration value of the electronic device detected by the acceleration sensor;
  compare the acceleration value of the electronic device with a preset acceleration value; and
  turn off the display screen or the electronic device when the acceleration value of the electronic device is more than the preset acceleration value.

3. The electronic device as recited in claim 1, wherein the electronic device further comprises a distance sensor, the distance sensor is configured to detect a distance value between human face and the display screen, the plurality of instructions is further configured to cause the device to:
  acquire the distance value detected by the distance sensor;
  determines whether the distance value between the human face and the display screen is in a preset distance range; and
  turn off the display screen or the electronic device when the distance value is not in the preset distance range.

4. The electronic device as recited in claim 1, wherein the electronic device further comprises a timer and an alarm apparatus, the timer is configured to record a display time of the display screen, the plurality of instructions is further configured to cause the device to:
  acquire the display time of the display screen recorded by the timer;
  compare the acquired display time with a preset time; and
  control the alarm apparatus to alarm when the display time is more than the preset time.

5. The electronic device as recited in claim 4, wherein the plurality of instructions is further configured to cause the device to:
  record alerts alarmed by the alarm apparatus; and
  turn off the electronic device when the recorded alerts is more than a preset plurality of alerts.

6. The electronic device as recited in claim 1, wherein the plurality of instructions is further configured to cause the device to:
  display a verification interface on the display screen, wherein the verification interface comprises an information input field, the information input field is configured to for a user to input the information.

7. The electronic device as recited in claim 1, wherein the electronic device can be a smart phone, a tablet computer, or a handheld computer.

8. A method for preventing eye damage through long-time viewing comprising:
  receiving an information input by an input unit;
  comparing the received information with a preset verification information;
  acquiring a brightness value detected by an illumination sensor when the information is matched with the preset verification information;
  determining whether the brightness value is in a first preset brightness range;
  acquiring a angular velocity value of the electronic device detected by a gyroscope;
  comparing the angular velocity value of the electronic device with a preset angular velocity value; and
  turning off a display screen of an electronic device or the electronic device when the brightness value is in the first brightness range and when the angular velocity value of the electronic device is not matched with the preset angular velocity value.

9. The method as recited in claim 8, further comprising:
  acquiring an acceleration value of the electronic device detected by an acceleration sensor;
  comparing the acceleration value of the electronic device with a preset acceleration value; and
  turning off the display screen or the electronic device when the acceleration value of the electronic device is more than the preset acceleration value.

10. The method as recited in claim 8, further comprising:
  acquiring a distance value between human face and the display screen detected by a distance sensor;
  determining whether the distance value between the human face and the display screen is in a preset distance range; and
  turning off the display screen or the electronic device when the distance value is not in the preset distance range.

11. The method as recited in claim 8, further comprising:
  acquiring the display time of the display screen recorded by a timer;
  comparing the acquired display time with a preset time; and
  controlling an alarm apparatus to alarm when the display time is more than the preset time.

12. The method as recited in claim 11, further comprising:
  recording alerts alarmed by the alarm apparatus; and
  turning off the electronic device when the recorded alerts is more than a preset of plurality of alerts.

13. A non-transitory storage medium having stored thereon instructions that, when executed by a processor of the electronic device, causes the processor to execute instructions of a method for preventing eye damage through long-time viewing, the method comprising:
  receiving an information input by an input unit;
  comparing the received information with a preset verification information;
  acquiring a brightness value detected by an illumination sensor when the information is matched with the preset verification information;
  determining whether the brightness value is in a first preset brightness range;
  acquiring a angular velocity value of the electronic device detected by a gyroscope;
  comparing the angular velocity value of the electronic device with a preset angular velocity value; and turning off a display screen of an electronic device or the electronic device when the brightness value is in the first brightness range and when the angular velocity value of the electronic device is not matched with the preset angular velocity value.

14. The non-transitory storage medium as recited in claim 13, wherein the method is further comprising:
acquiring an acceleration value of the electronic device detected by an acceleration sensor;
comparing the acceleration value of the electronic device with a preset acceleration value; and
turning off the display screen or the electronic device when the acceleration value of the electronic device is more than the preset acceleration value.

15. The non-transitory storage medium as recited in claim 13, wherein the method is further comprising:
acquiring a distance value between human face and the display screen detected by a distance sensor;
determining whether the distance value between the human face and the display screen is in a preset distance range; and
turning off the display screen or the electronic device when the distance value is not in the preset distance range.

16. The non-transitory storage medium as recited in claim 13, wherein the method is further comprising:
acquiring the display time of the display screen recorded by a timer;
comparing the acquired display time with a preset time; and
controlling an alarm apparatus to alarm when the display time is more than the preset time.

17. The non-transitory storage medium as recited in claim 16, wherein the method is further comprising:
recording alerts alarmed by the alarm apparatus; and
turning off the electronic device when the recorded alerts is more than a plurality of preset alerts.

* * * * *